(12) United States Patent
Bloor et al.

(10) Patent No.: US 6,334,260 B1
(45) Date of Patent: Jan. 1, 2002

(54) STRATA MOVEMENT INDICATORS

(75) Inventors: Alan Stuart Bloor, Stafford; Paul Alan Fletcher, Derbyshire, both of (GB)

(73) Assignee: Rock Mechanics Technology Limited, Notts (GB)

( * ) Notice: Subject to any disclaimer, the term of this patent is extended or adjusted under 35 U.S.C. 154(b) by 0 days.

(21) Appl. No.: 09/514,290

(22) Filed: Feb. 28, 2000

(30) Foreign Application Priority Data

Mar. 4, 1999 (GB) ............................................. 9904826

(51) Int. Cl.[7] .......................... E21B 47/00; G01B 5/30; G01D 13/22
(52) U.S. Cl. ........................... 33/308; 33/1 H; 116/285; 116/303
(58) Field of Search ............................... 33/1 H, 1 HH, 33/302, 304, 308, 792, 832, 833; 116/281, 283, 284, 285, 298, 303, 305

(56) References Cited

U.S. PATENT DOCUMENTS

| | | | | |
|---|---|---|---|---|
| 3,828,435 A | * | 8/1974 | Baker ............................ | 33/1 H |
| 4,070,906 A | | 1/1978 | Rupert et al. ................ | 73/88 E |
| 4,514,905 A | * | 5/1985 | Lutzens ....................... | 33/1 H |
| 4,622,750 A | * | 11/1986 | Dudek et al. ................ | 33/1 H |
| 5,284,107 A | * | 2/1994 | Milne et al. ................. | 33/1 H |
| 5,345,685 A | * | 9/1994 | Bloor .......................... | 33/308 |
| 5,685,082 A | * | 11/1997 | Proulx ......................... | 33/1 H |
| 5,937,371 A | * | 8/1999 | Gruetzmacher .............. | 33/308 |
| 5,966,829 A | * | 10/1999 | Lia et al. ...................... | 33/832 |
| 6,205,946 B1 | * | 3/2001 | Picton ......................... | 33/1 H |

FOREIGN PATENT DOCUMENTS

| | | |
|---|---|---|
| GB | 2 253 707 | 9/1992 |
| GB | 2 268 809 | 1/1994 |

* cited by examiner

*Primary Examiner*—Diego Gutierrez
*Assistant Examiner*—Madeline Gonzalez
(74) *Attorney, Agent, or Firm*—Burns, Doane, Swecker & Mathis, L.L.P.

(57) ABSTRACT

A strata movement indicator suspended within a borehole 1 is provided with a drive element 6 and a reference element 12, relative movement between the elements being translated into rotary motion to give a visual indication on an indicator 10, 24 on the respective elements.

22 Claims, 5 Drawing Sheets

STRATA MOVEMENT INDICATORS

BACKGROUND OF THE INVENTION

1. Field of the Invention

This invention concerns improvements in or relating to strata movement indicators.

2. Description of Related Art

In particular the present invention has reference to indicators of the type described in United Kingdom Patents Nos 2 253 707 and 2 268 809 for use in underground mines in which an indicator element is suspended from an anchor within a borehole in the strata, the element registering with a guide fixed in the mouth of the borehole. The degree of extension of the element from the guide is equal to the strata movement.

These earlier indicators provided a simple and yet effective visual means of illustrating strata movement, but their usefulness was limited to employment in workings of relatively low height thereby allowing ready inspection. However, in areas where the roof height is above that for which parallax-free, close approach is practicable, the accuracy of reading is reduced. The problem is even greater when, for a high roof, the allowable movement is small.

OBJECTS AND SUMMARY

An object of the invention is therefore to provide an improved means of indicating strata movement in terms of accuracy, sensitivity and ease of visibility from floor level.

A further object of the invention is to provide such means whereby the effect of strata movement is amplified and displayed with minimum parallax for an observer at floor level.

According to the invention a strata movement indicator includes a flexible suspension member, an anchor for anchoring the suspension member in use within a borehole, a drive element carried by the suspension member and extending in use generally within the mouth of the borehole, a reference element interengaging the drive element, a first indicator means associated with the drive element, a second indicator means associated with the reference element, whereby in use strata movement occasions substantially relative linear motion as between the drive element and the reference element and the said interengagement effects rotary motion as between the first and second indicator means to provide a visual indication of the extent of strata movement as given by the said relative motion.

The visible indication is advantageously amplified to facilitate reading by an observer from floor level.

In a first embodiment of the invention the drive element is provided with engagement means which may be in the form of a profiled protrusion interengaging the reference element which is adapted for fixture within the mouth of the borehole and is provided with a slot for engaging the protrusion, whereby in use upon relative linear movement between the drive and reference elements rotary motion is occasioned thereto to give relative movement as between the first and second indicator means, such movement providing an indication of the movement of the drive element and thus of the strata. The first indicator means may be in the form of a pointer and the second indicator means may be in the form of a circular scale or vice versa. The scale is preferably calibrated to give a visual indication of the extent of linear movement and the calibration may be in chromatic sector form or may provide actual measurement or may be a combination of both, the scale being of sufficiently large dimension as to be readable from floor level.

The drive element of the first embodiment may be formed with two or more slots engaging the protrusion thereby to provide stability in use during movement.

In a second embodiment of the invention, the drive element is provided with engagement means in the form of a guide slot for engagement with the reference element which is adapted for fixture within the mouth of the borehole and which has a profiled protrusion mating with the slot in such manner that relative linear movement also causes rotation of the drive element and also of the first indicator means in relation to the second indicator means. As an example, the protrusion may be helically profiled whereby by virtue of the interengagement of the slot with the protrusion, relative linear movement forces the drive element to rotate taking a helical path thereby causing the first indicator means to move in relation to the second indicator means. As with the first embodiment, two or more slots may be provided for stability. The protrusion may be aligned axially of the borehole or may be offset therefrom.

The first and second indicator means of the second embodiment may be of the same type as for the first embodiment.

The first and second indicator means are disposed relatively closely to the mouth of the borehole which may be formed in the roof of a mine roadway or other working site, or other civil engineering environment.

In a further embodiment of the invention, two or more suspension wires may be provided with the associated features of either the first or second embodiments or a combination of both, each wire being anchored at a different point along the length of the borehole thereby to provide an indication of strata movement at each point.

BRIEF DESCRIPTION OF THE DRAWINGS

By way of example only, three embodiments of strata movement indicator according to the invention are described below with reference to the accompanying drawings in which.

DETAILED DESCRIPTION OF THE PREFERRED EMBODIMENTS

Figure 1:
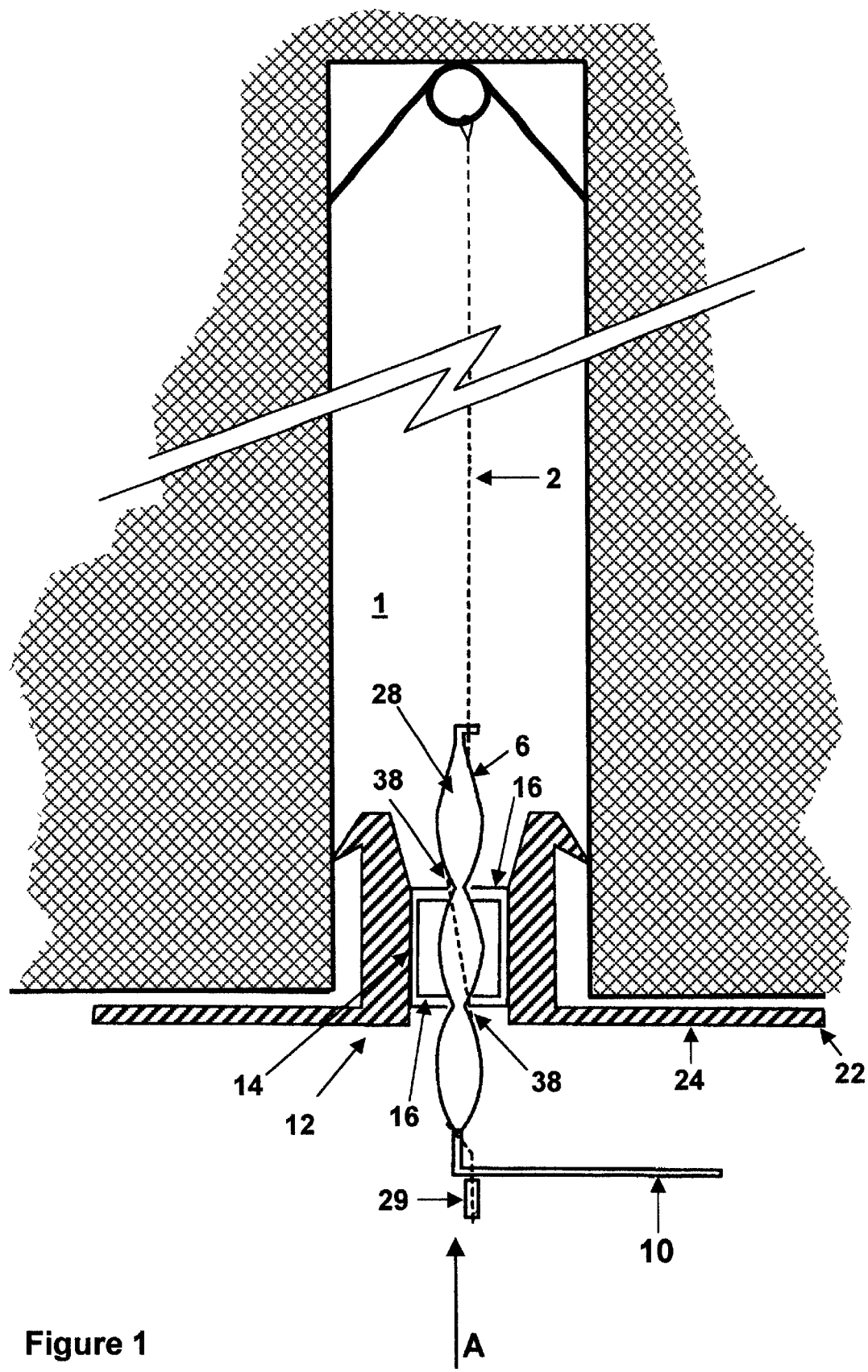
FIG. 1 is a cross sectional view through a borehole formed in a mine roadway showing a first embodiment in situ.

In the drawings like numerals of reference have been used throughout to denote like features.

Figure 2:
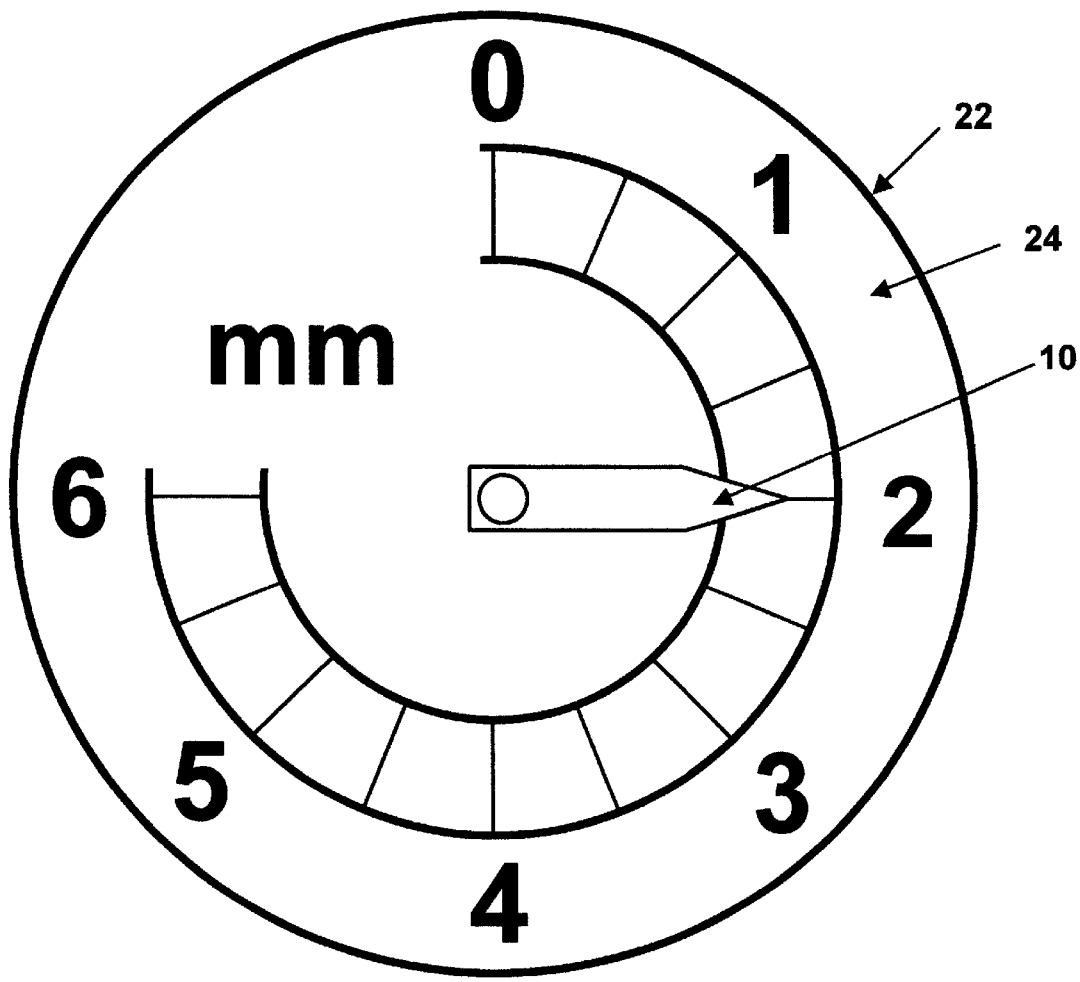
FIG. 2 is an end view on the arrow A in FIG. 1 with parts removed for clarity.

Referring first to FIGS. 1 and 2, a first embodiment of strata movement indicator is illustrated. A suspension wire 2 is anchored within the borehole 1 and carries a drive element 6 in the form of a shaft 28 having a helical profile as shown, the wire 2 being held on the shaft 28 by a crimp 29 at the relatively lower end thereof. A reference element 12 is fixed within the mouth of the borehole 1 and has a collar 14 provided with two crossbars 16 in each of which is machined a slot 38 for engagement with the helically profiled shaft 28, the wire 2 following the path of the helix and passing therewith through the slots 38 a shown.

The element 6 in the form of shaft 28 carries at its relatively outer end a pointer 10 and the reference element 12 has a calibrated scale 24 presented on an outwardly directed flange 22 circumscribing the borehole 1.

In operation, movement of the strata occasions relative movement as between the elements 6 and 12 and in this embodiment such movement causes rotation of the helically profiled shaft 28 in relation to the slots 38 and in this way a visual indication as to the magnitude of the strata movement is given by the pointer 10 and the calibrated scale. Since the scale is flat and easily visible, the measured movement can be read from the floor level of the mine roadway.

Figure 3:
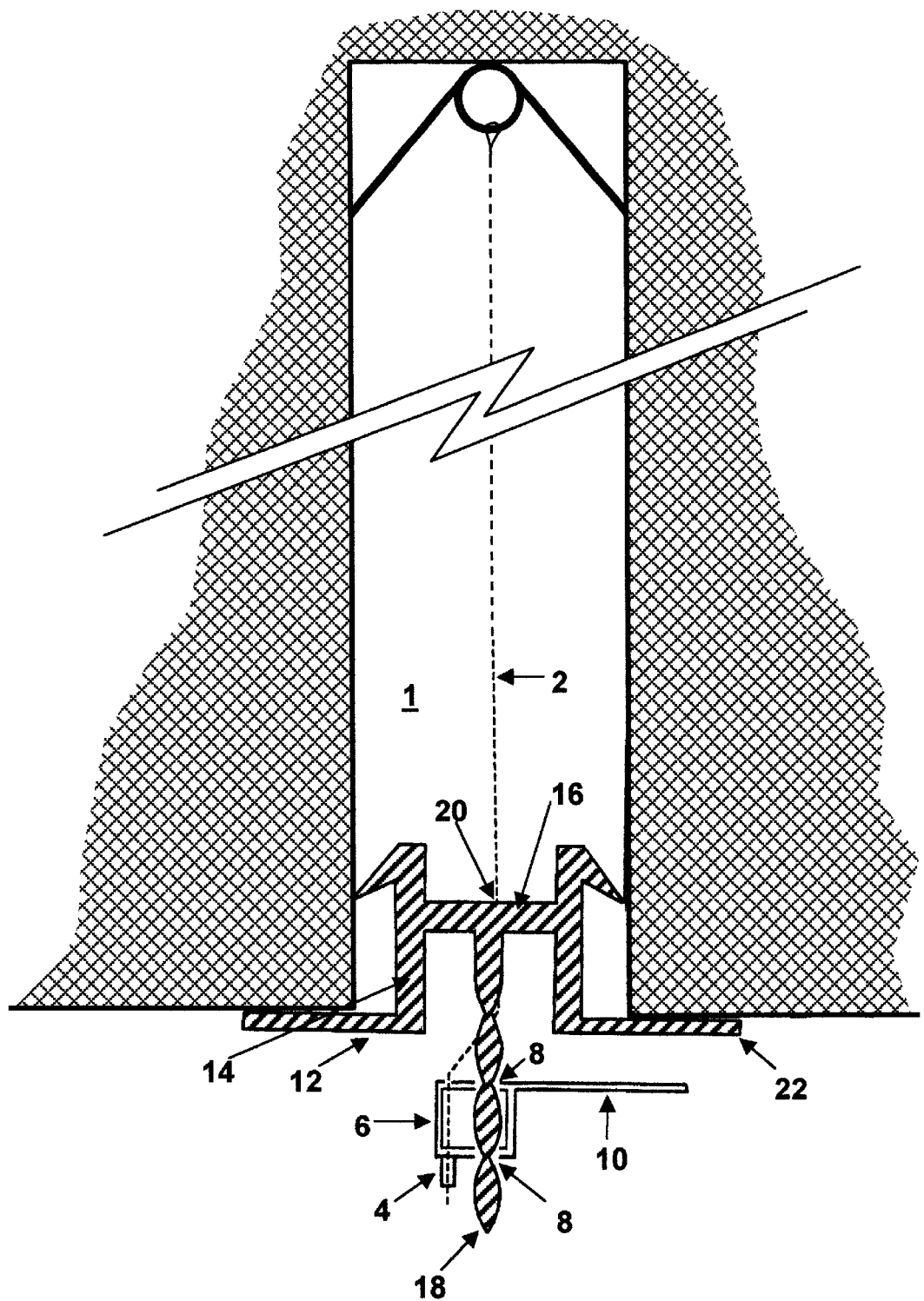
FIG. 3 is a cross sectional view through a borehole formed in a mine roadway showing a second embodiment in situ.

Referring now to FIG. 3 a second embodiment of strata movement indicator is shown in situ associated with a borehole 1 formed in the roof of a mine roadway (not shown) and includes a suspension wire 2 which is provided with a suitable anchor (not shown) disposed at the distal end of the borehole 1 or at some predetermined location therealong. The anchor may be in the form of a simple spring arrangement securing the suspension wire 2 within the borehole.

The suspension wire 2 carries a positioning crimp 4 which positively locates a drive element 6 formed as a hub provided with two slots 8 and a first indicator means in the form of a pointer 10.

A reference element 12 is fixed within the mouth of the borehole 1 and for this purpose has a relatively short cylindrical collar 14 which frictionally engages the wall of the borehole. A crossbar 16 is provided within the collar 14 and has a downwardly extending shaft 18 having a helical profile as shown and engaging the slots 8 of the drive element 6. The crossbar 16 has an aperture 20 through which passes the suspension wire 2.

The collar 14 has an outwardly extending flange 22 which circumscribes the borehole 1 and carries a circular calibrated scale (not shown), of similar form to that of the first embodiment, to provide a reference dial against which strata movement is measured by the pointer 10.

In use with the suspension wire 2 firmly anchored within the borehole 1 and the integers above described in place as shown, downward movement of the surrounding strata occasions the drive element 6 through the agency of the slots 8, and the pointer 10 to rotate about the helically profiled shaft 18 in relation to the static scale thereby giving a measure of the movement. Since the scale is flat and easily visible, the measured movement can be read from the floor level of the mine roadway.

Figure 4:
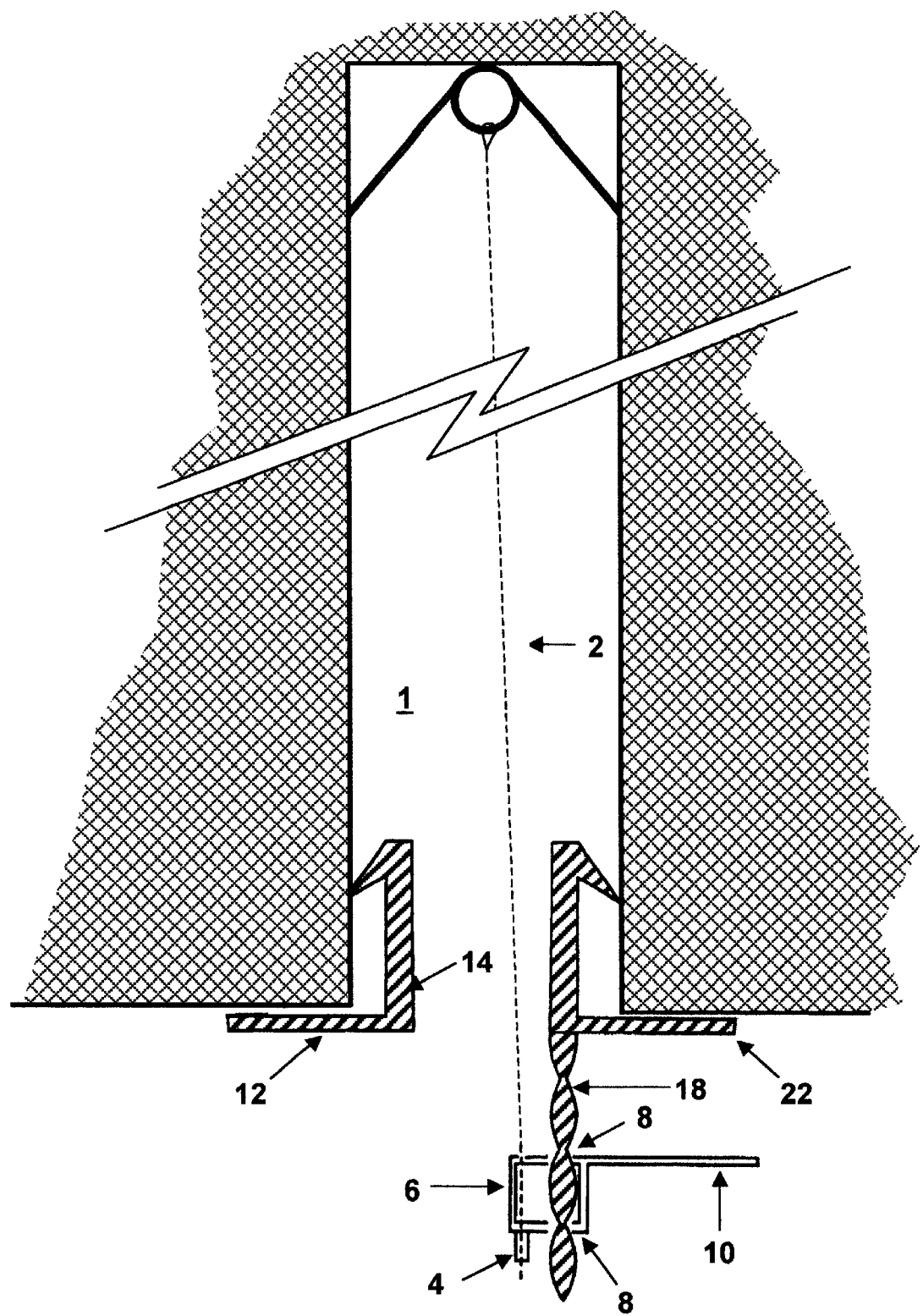
FIG. 4 is a cross sectional view through a borehole formed in a mine roadway showing a variation of the second embodiment in situ.

Referring now to FIG. 4, a variation on the second embodiment is shown whereby the profiled shaft 18 is offset to the side of the collar 14 rather than being disposed axially of the borehole. In all other principal respects the configuration is the same as that for FIG. 3. The advantage of this variation is to reduce the possibility of the suspension wire fouling the crossbar. This problem would not normally arise because the rotation would be restricted to less than 360° to avoid ambiguity. The problem could be further reduced by pre-winding the suspension cable around the helix so that it unwinds as the strata movement occurs.

Figure 5:
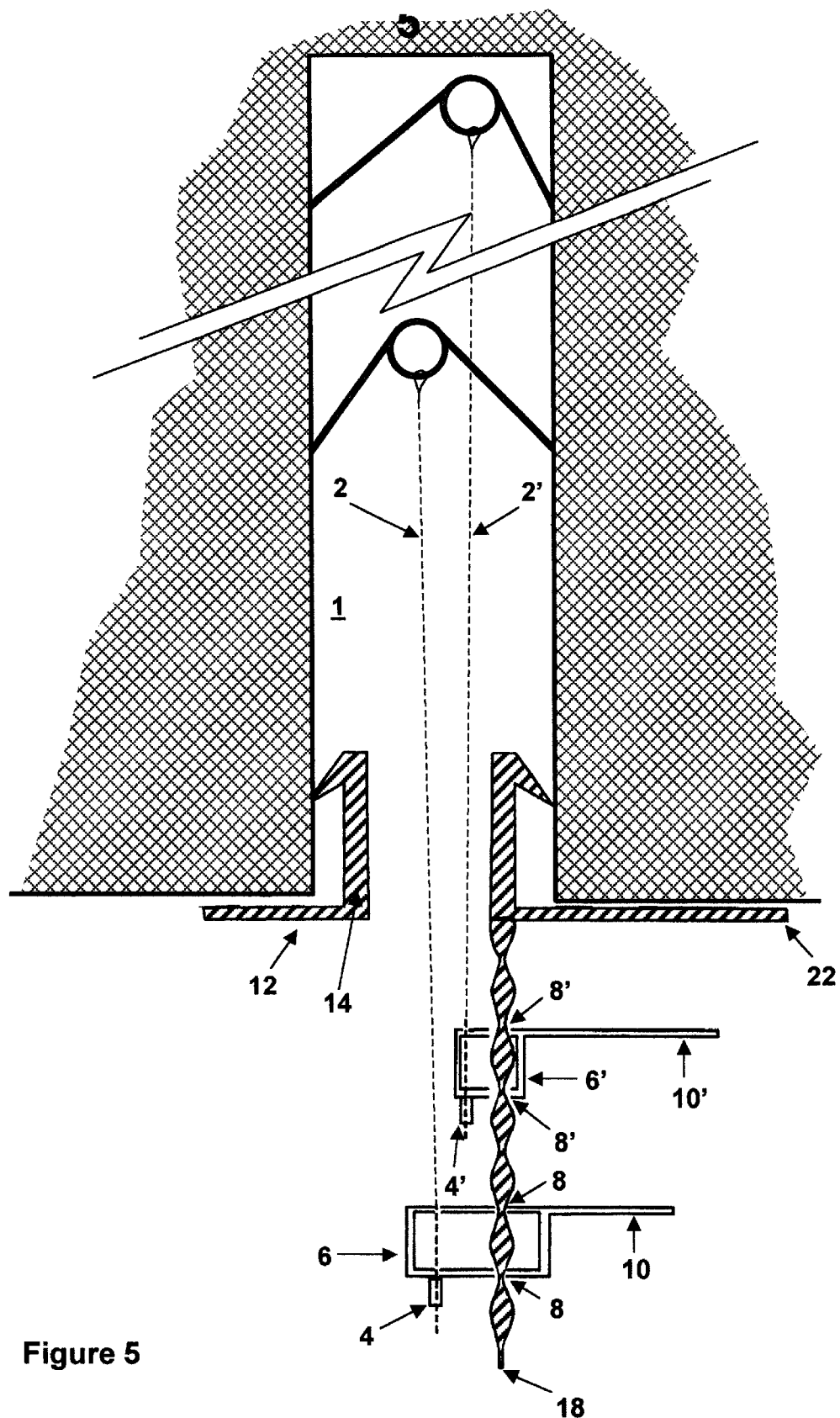
FIG. 5 is a cross sectional view through a borehole formed in a mine roadway showing a third embodiment in situ.

Referring to FIG. 5 a third embodiment is shown and essentially provides for monitoring the movement of strata at two locations along the borehole 1 and accordingly two suspension wires 2, 2' are provided each of which carries a drive element 6, 6' having a crimp 4, 4' to hold the element in position, each drive element being formed with slots 8, 8' respectively. Each drive element 6, 6' has a pointer 10,10'.

A reference element 12 is provided and is common to each drive element 6, 6' and has a downwardly extending drive element in the form of a helically profiled shaft 18 offset from the longitudinal axis of the element. The shaft 18 engages the respective slots 8, 8' in the drive elements 6, 6'.

The reference element 12 includes a collar 14 which is fixed within the mouth of the borehole 1 and has an outwardly extending flange 22 which carries indicator scales (not shown) on its downwardly directed face.

In operation with the suspension wires 2, 2' anchored as aforesaid within the borehole 1 at different and spaced apart locations and the drive and reference elements 6, 6', 12 assembled as described, any movement of strata is monitored with indications as to the magnitude at the different levels being displayed by the pointers 10, 10' which move relative to the scales. In this embodiment it would be necessary to limit the relative rotations to avoid interference between the elements and the suspension wires.

It will be appreciated that whilst the specific examples have been directed to drive elements with helical formations, other formations which translate linear into rotary motion may equally be employed. Further, the use of chromatic sectors in place of or in addition to calibrated scales may be used to indicate the magnitude of strata movement.

Although the invention has been described in relation to vertical boreholes in the roof of a structure, it is to be understood that it could be applied in boreholes formed in side walls on floor if such were difficult to approach closely and/or had small allowable movements.

What is claimed is:

1. A strata movement indicator including a flexible suspension member, an anchor for anchoring the suspension member in use within a borehole, a drive element carried by the suspension member and extending in use generally within the mouth of the borehole, a reference element interengaging the drive element, a first indicator means associated with the drive element, a second indicator means associated with the reference element, whereby in use strata movement occasions substantially relative linear motion as between the drive element and the reference element and the said interengagement effects rotary motion as between the first and second indicator means to provide an amplified visual indication of the extent of strata movement as given by the said relative motion.

2. A strata movement indicator according to claim 1 in which the drive element is provided with engagement means in the form of a guide slot for engagement with the reference element which is adapted for fixture within the mouth of the borehole, the reference element having a profiled protrusion mating with the slot in such manner that relative linear movement also causes rotation of the drive element and thus of the first indicator means in relation to the second indicator means.

3. A strata movement indicator according to claim 2 in which the protrusion is helically profiled whereby by virtue of the interengagement of the slot with the protrusion, relative linear movement forces the drive element to rotate taking a helical path thereby causing the first indicator means to move in relation to the second indicator means.

4. A strata movement indicator according to claim 2 in which the drive element is formed with two or more slots engaging the protrusion thereby to provide stability in use during movement.

5. A strata movement indicator according to claim 1 in which the drive element is provided with engagement means which are in the form of a profiled protrusion interengaging the reference element which is adapted for fixture within the mouth of the borehole and is provided with a slot for engaging the protrusion, whereby in use upon relative linear movement between the drive and reference elements rotary motion is occasioned thereto to give relative movement as between the first and second indicator means, such movement providing an indication of the movement of the drive element and thus of the strata.

6. A strata movement indicator according claim 1 in which the first indicator means is in the form of a pointer and the second indicator means is in the form of a circular scale or vice versa.

7. A strata movement indicator according to claim 6 in which the scale is calibrated to give a visual indication of the extent of linear movement.

8. A strata movement indicator according to claim 7 in which the calibration is in chromatic sector form or provides actual measurement or is a combination of both.

9. A strata movement indicator according to claim 1 in which two or more suspension wires are provided with a drive element and reference element in accordance with claim 1, each wire being anchored at a different point along the length of the borehole thereby to provide an indication of strata movement at each point and thereby of differential strata movement between the two points.

10. A strata movement indicator comprising:

a flexible suspension member, an anchor for anchoring the suspension member in use within a borehole, a drive element carried by the suspension member and extending in use generally within a mouth of the borehole, a reference element drivably engaging the drive element, a first indicator connected to the drive element, and a second indicator connected to the reference element, the engagement between the drive element and the reference element being arranged so as to convert linear motion to rotary motion, and the first and second indicators providing an amplified visual indication of the extent of strata movement as given by said relative motion.

11. A strata movement indicator according to claim 10, in which the first indicator is in the form of a pointer and the second indicator is in the form of a circular scale.

12. A strata movement indicator according to claim 10, in which the first indicator is in the form of a circular scale and the second indicator is in the form of a pointer.

13. A strata movement indicator according to claim 10, in which one of the first and second indicators is in the form of a circular scale which is calibrated to give a visual indication of the extent of linear movement.

14. A strata movement indicator according to claim 13, in which the calibration is in chromatic sector form.

15. A strata movement indicator according to claim 13, in which the calibration provides actual measurement.

16. A strata movement indicator according to claim 13, in which the calibration is a combination of a chromatic sector form and actual measurement.

17. A strata movement indicator according to claim 10, in which at least two suspension wires are provided each with a drive element and a reference element in accordance with claim 10, each wire being anchored at a different point along the borehole, an indication of strata movement at each such point and of differential strata movement between the points being provided.

18. A strata movement indicator comprising:

a flexible suspension member, an anchor for anchoring the suspension member in use within a borehole, a drive element carried by the suspension member and extending in use generally within a mouth of the borehole, the drive element being provided with a guide slot, a reference element drivably engaging the drive element and being adapted for fixture within the mouth of the borehole, the reference element having a profiled protrusion mating with the slot, a first indicator connected to the drive element, a second indicator connected to the reference element, the engagement between the slot of the drive element and the profiled protrusion of the reference element arranged so as to convert linear motion to rotary motion, the rotation of the drive element and of the first indicator providing an amplified visual indication of the extent of strata movement as given by said relative motion in relation to the reference element and the second indicator.

19. A strata movement indicator according to claim 18, in which the profiled protrusion is helical.

20. A strata movement indicator according to claim 18, in which the drive element has at least two slots engaging the profiled protrusion.

21. A strata movement indicator comprising:

a flexible suspension member, an anchor for anchoring the suspension member in use within a borehole, a drive element carried by the suspension member and extending in use generally within a mouth of the borehole, the drive element being provided with a profiled protrusion, a reference element drivably engaging the drive element and being adapted for fixture within the mouth of the borehole, the reference element being provided with a slot for engaging the profiled protrusion of the drive element, a first indicator connected to the drive element, a second indicator connected to the reference element, the engagement between the drive element and the reference element being adapted relatively to convert linear motion to rotary motion, rotation of the drive element and of the first indicator providing an amplified visual indication of the extent of strata movement as given by said relative motion in relation to the reference element and the second indicator.

22. A strata movement indicator according to claim 21, in which the profiled protrusion is helical.

* * * * *